Nov. 30, 1948.    J. T. JANETTE    2,455,335
CENTRIFUGALLY OPERATED ELECTRIC GOVERNOR
Filed April 2, 1945
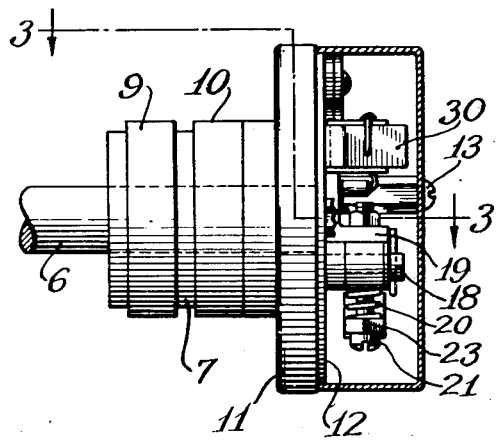
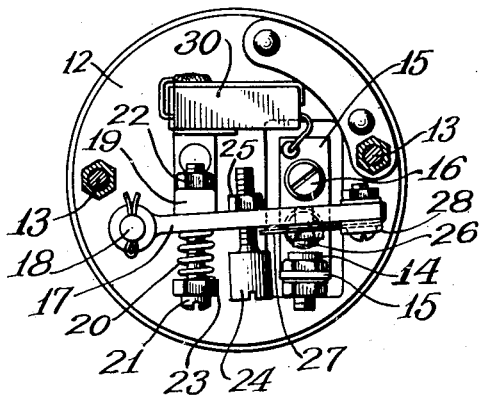
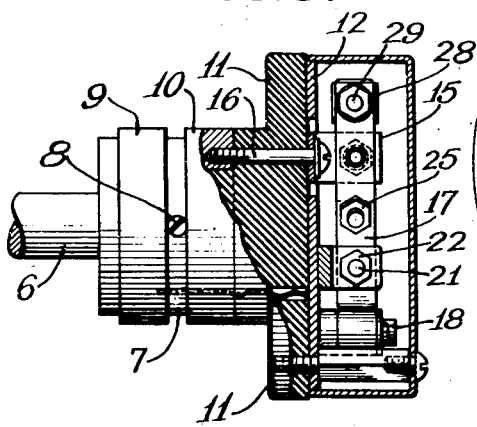
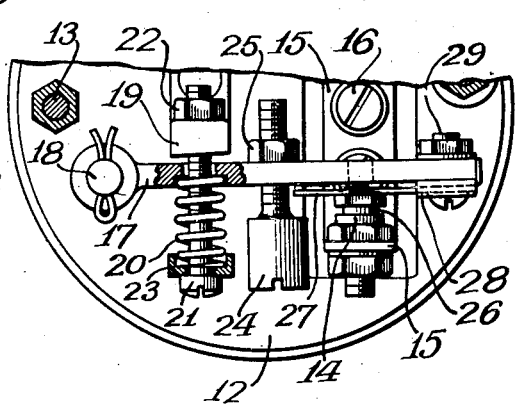
Inventor:
John T. Janette
By Glenn S. Noble
Attorney Patented Nov. 30, 1948

2,455,335

UNITED STATES PATENT OFFICE 2,455,335

CENTRIFUGALLY OPERATED ELECTRIC GOVERNOR

John T. Janette, Kenilworth, Ill., assignor to Janette Manufacturing Company, Chicago, Ill., a corporation of Illinois Application April 2, 1945, Serial No. 586,167

5 Claims. (Cl. 201—50)

1

Electric current for use in radar operations such, for instance, as used for vacuum tube transmitting and receiving systems should be accurately governed or controlled. I have manufactured motor-generators consisting of D. C. motors and A. C. generators with which any voltage input to the motor between the limits of 210 to 260 volts and with a change in the generator load from full load to approximately ¼ load, the frequency of the alternating current output is between the limits of 59 to 61 cycles. This frequency is maintained automatically by means of a motor speed regulator, mounted on the motor which regulator forms the subject matter of the present invention.

The objects of the present invention are to provide an electric motor governor or speed regulator which consists of relatively few parts and is durable in construction and particularly efficient and long lasting in operation; to provide a governor having extremely sensitive means of adjustment; to provide a governor having coacting contact points which are normally in yielding contact when the motor is running, one of said contacts being supported by means of a spring whereby it is pressed into engagement with the other contact which will cause an interaction between such points tending to prevent sparking or arcing and to keep the surfaces clean; to provide a motor with an improved governor for automatically regulating the speed within close limits; and to provide such other novel features and advantages in operation as will appear more fully hereinafter.

In the accompanying drawings illustrating this invention,

Fig. 1 is a side view of the governor shown mounted on a motor shaft with the cover of the governor shown in section;

Fig. 2 is a front view with the cover removed;

Fig. 3 is a sectional view taken substantially on the line 3—3 of Fig. 1; and

Fig. 4 is an enlarged detail of the supporting and adjusting means for the contact points.

As shown in these drawings, 6 represents the shaft of any motor suitably constructed to be governed by means of my improved governor, such motors being well known and in common use. The governor has a cylindrical body portion 7 formed of insulating material which is secured to the shaft in any convenient manner as by means of a set screw 8. The collector rings 9 and 10 are mounted on this cylindrical or hub portion and are connected with the field circuit of the motor in the usual manner. The body

2 portion 7 has an integrally formed outwardly extending flange 11 to which is secured a metallic disc or governor plate 12 by means of screws 13.

A fixed contact or contact point 14 is detachably secured, as shown, to a bracket 15 secured to the insulating flange 11 by means of screws 16 whereby it is insulated from the disc 12; this bracket being electrically connected with the collector ring 10.

A contact arm 17 is pivotally mounted on a stud 18 secured to the disc 12 whereby it is mechanically and electrically connected with such disc. This disc in turn is electrically connected with the collector ring 9 in the usual manner. The contact arm 17 engages with a stop 19 fixed to the disc 12. It is held against the stop by means of adjusting spring 20 which coacts with a regulating screw 21 which has threaded engagement with a hole in the stop 19 and which may be held in adjusted position by means of a lock nut 22. A cap or washer 23 is preferably interposed between the spring and the head of the screw to prevent twisting of the spring when the screw is turned for adjustment. A weight 24 is adjustably mounted on the contact arm 17 by means of a threaded stem which engages with a threaded hole in the arm and may be held in adjusted position by means of a lock nut 25.

Heretofore with governors of this type in which the contact points are rigidly secured to their supporting members, thin films have frequently been formed on one or the other of the contact points or excessive pitting and erosion of the contacts may cause them to stick and prevent proper operation of the governor. This is due to the fact that when the relatively movable governor member carrying one of the contacts is moved during its automatic operation even a slight amount, arcing or sparks are formed between the contact points. Slight movement of such movable member often occurs frequently during the operation of the governor and as a consequence, I have found that governors made in such manner often require frequent servicing or cleaning of the contact points.

One of the particularly important features of the present invention is the mounting of the relatively movable contact on the contact arm in such a manner as to improve the operation of the apparatus and tend to prevent the causing of the film or deposit on the contact points. Accordingly I mount the contact 26 on a light spring 27 and secure one end of the spring to the outer or free end of the arm 17 by means of a saddle or bracket 28 and bolt 29 as shown, the arrangement being such that the spring is free to vibrate or more particularly to hold the contacts yieldingly together during a predetermined movement of the free end of the arm 17.

A condenser 30 is mounted on the governor disc as shown and is connected across the contact points to protect the same in the usual manner.

After the governor has been attached to the motor, the first or initial adjustment is made by means of the adjusting screws 21 and spring 20. The final or more accurate adjustment of the speed regulator is then made by adjusting the weight 24 which is done by screwing the weight out to lower the speed and in to increase the speed. After it has been adjusted, it may be held in such position by means of the lock nut 25.

The governor is rotated in the proper direction to cause the contact arm 17 and parts connected therewith to swing outwardly under centrifugal force against the tension of the spring 20. When the speed reaches a predetermined rate, the movable contact point 26 will engage with the stationary contact point 14 which closes the circuit through these points and the speed control is caused principally by variation in the resistance in the field circuit due to the variation of the pressure between such points. It will be understood that these points do not separate during the normal running speed of the motor, but remain in constant contact until the motor is stopped or the speed reduced beyond a predetermined rate. This resilient pressure causes an interaction between the surfaces of the contact points which tends to keep them clean and prevent the formation of film or the pitting or building up of the respective points. I have found that when the contacts are mounted in this particular manner, and operated as described, they remain clean and do not become deformed or worn away for a far greater length of time than when mounted in the usual manner. The advantages obtained by utilizing the variation in the conductivity of the circuit due to the variation in pressure on the contact points, thus assists in maintaining the accurate control of speed desired for such motors.

While I have shown and described a preferred form of my improved speed regulator or governor as applied to a particular type of motor, it will be noted that changes may be made in the construction of the same and that a governor may be used for other purposes without departing from the scope of this invention as set forth in the following claims in which I claim:

1. The combination with a motor having a shaft, of a governor plate mounted on the shaft at a right angle thereto and rotating with the shaft, a contact arm pivotally mounted on the plate and vibrating in a plane parallel to the face of the plate, a spring having its outer end secured to the free end of the arm and extending toward the pivot, a contact carried by the free end of the spring, a second contact adapted to coact with said contact, means for supporting the second contact whereby it is insulated from the first contact, a stop for limiting the movement of the arm, a spring tending to urge the arm toward the stop, means for adjusting the tension on the last named spring, a governor weight and means for adjustably connecting the weight to the arm whereby it may be adjusted laterally with respect to the arm the arrangement being such that when the shaft is rotated, centrifugal force will act on the first named spring and the contact carried thereby tending to close the contacts and thereafter to vary the pressure between the contacts.

2. A governor, comprising a rotable body member, a metallic disc coaxially mounted on said member, a pivot on the disc at a distance from the center thereof, a contact arm carried by said pivot and extending transversely of the disc, a light, flat spring having one end secured to the outer end of the arm and extending toward the pivot, a contact point carried by the inner free end of said spring, a bracket mounted on the body portion and insulated from the disc, a contact point carried by said bracket to cooperate with the first named point, a stop on the disc for limiting the movement of the arm in one direction, a screw extending through the arm and having threaded engagement with the stop, a spring carried by the screw and engaging with the arm, and a governor weight carried by a stem having threaded engagement with the arm whereby the weight may be adjusted laterally with respect to the arm the construction being such that when the disc is rotated, centrifugal force will act on the contact arm and also on the spring carried thereby and tend to cause the contact on the spring to press against the contact carried by the bracket with variable pressure.

3. In a governor, the combination of a body having an outwardly extending flange at one end, collector rings carried by said body, a disc secured to the flange, a contact arm pivotally mounted on the disc and vibrating in a plane parallel to the disc and adapted to be actuated by centrifugal force, a light elongated spring having one end secured to the free end of the arm and extending toward the pivot, a contact point carried by the free end of said spring, a second contact point carried by the body portion and insulated from the first named point, adjustable spring means tending to oppose the movement of the arm by centrifugal force, an adjustable weight carried by said arm and electrical connections from the contact points to the respective collector rings.

4. A governor comprising a body portion formed of insulating material and adapted to be secured to a motor shaft, collector rings on said body portion, a metallic disc mounted concentrically on the body portion, a pivot extending outwardly from the disc at a distance from the center thereof, a rigid arm carried by said pivot and extending in a plane parallel to the disc, a flat spring, means for securing one end of the spring to the free end of the arm and leaving the spring free to vibrate, a contact carried by the free end of said spring, a second contact adapted to coact with said contact, means for supporting the second contact on the body portion whereby it is insulated from the first named contact, a laterally adjustable weight carried by said arm, adjustable means tending to resist the movement of the arm under centrifugal force, and electrical connections between the contacts and the respective rings.

5. In a governor, the combination of a shaft and a support mounted at right angles to the axis of the shaft, a contact arm pivoted at one end to said support and vibrating in a plane parallel to the support whereby it will be acted upon by centrifugal force when the shaft is rotated, a contact fixed on said support, a light spring having one end secured to the outer end of the arm and lying in a plane parallel to the arm, a contact carried by the free end of said spring and adapted to coact with the fixed contact, said spring and contact carried thereby also being acted upon by centrifugal force, tending to hold the contacts in closed position when the shaft is rotated at a predetermined speed, and spring means coacting with the contact arm tending to bias it to open position of the contacts.

JOHN T. JANETTE.

REFERENCES CITED

The following references are of record in the file of this patent:

UNITED STATES PATENTS

| Number | Name | Date |
|---|---|---|
| 1,476,824 | Leeds | Dec. 11, 1923 |
| 1,487,314 | Chaplin | Mar. 18, 1924 |
| 1,548,479 | Obermaier | Aug. 4, 1925 |
| 1,647,020 | Schmidt | Oct. 25, 1927 |
| 2,021,941 | Loftis | Nov. 26, 1935 |
| 2,103,589 | Lee | Dec. 28, 1937 |